United States Patent [19]

Kitchen

[11] Patent Number: 4,894,530
[45] Date of Patent: Jan. 16, 1990

[54] FIBER OPTIC SNAP ACTING SWITCH

[75] Inventor: Robert D. Kitchen, Johnson City, Tenn.

[73] Assignee: Honeywell, Inc., Minneapolis, Minn.

[21] Appl. No.: 32,798

[22] Filed: Mar. 31, 1987

[51] Int. Cl.$^4$ .................................................. H01J 5/16
[52] U.S. Cl. ..................................... 250/227; 250/229
[58] Field of Search .................... 250/227, 229; 341/31

[56] References Cited

U.S. PATENT DOCUMENTS

| | | |
|---|---|---|
| 4,170,731 | 10/1979 | Howell et al. . |
| 4,196,348 | 4/1980 | Iwakiri et al. . |
| 4,223,217 | 9/1980 | Bongard et al. . |
| 4,376,566 | 3/1983 | Blackington ......................... 250/227 |
| 4,572,035 | 2/1986 | Sakurai et al. ........................ 250/229 |
| 4,607,160 | 8/1986 | Sakakino .............................. 250/227 |

FOREIGN PATENT DOCUMENTS 1527342 10/1978 United Kingdom .

Primary Examiner—David C. Nelms
Assistant Examiner—Khaled Shami
Attorney, Agent, or Firm—Charles L. Rubow

[57] ABSTRACT

A snap acting fiber optic switch in which a carrier operates between two stop surfaces separated by a wedge shaped gap. A planar shutter perpendicular to the stop surfaces extends from an end of the carrier at the wide end of the wedge shaped gap into a gap between opposing end faces of a pair of optical fibers aligned with an axis perpendicular to the plane of the shutter. A plunger actuated over center snap acting mechanism biases the carrier toward one or the other of the stop surfaces, depending on the position of the plunger.

5 Claims, 3 Drawing Sheets

FIBER OPTIC SNAP ACTING SWITCH

BACKGROUND OF THE INVENTION

The invention disclosed herein relates generally to optomechanical switching, and more particularly to snap acting mechanical devices for achieving precision switching of light carried through optical fibers.

Use of mechanically switched light signals for performing monitoring and control functions and mechanical devices for achieving such switching have been in common use for some time. Systems using light signals have a number of well known advantages over electrical systems, such as offering intrinsic safety in explosive and other hazardous environments. In addition, mechanically actuated devices for switching light signals have a number of advantages over corresponding devices for switching electrical signals, such as immunity to contact bounce and wear. Apparatus for carrying and switching light signals also tends to be relatively immune to changes caused by environmental conditions such as changing temperature and humidity.

Nevertheless, the use of electrical signals and devices and apparatus for switching and using such signals have traditionally been much more extensively used. As a result, electromechanical switch construction and packaging has been standarized to the point that various families of such switches are relatively well defined in terms of switch housing configuration, actuator arrangements, mechanical operating characteristics, mounting hole spacing, etc.

Electromechanical switch design has also been refined to the point that the switches of any particular class can be relied upon as having quite precise and repeatable switching characteristics. One of the mechanical characteristics associated with precision switching is low travel of the switching element between actuated and unactuated states. This characteristic is commonly achieved through the use of an over center snap acting mechanism, of which a number of well developed designs are now in existence.

With the increasing trend toward adopting control systems using light signals and toward replacing existing electromechanical control systems and components in some applications with corresponding optomechanical control systems and components has come an increasing need for optomechanical switches which duplicate as nearly as possible the form, fit and mechanical characteristics of existing standard electromechanical switches. With this as an objective, many previous snap acting mechanism designs have been applied to optomechanical switches.

For example, U.S. Pat. No. 4,170,731 issued to M.J. Howell, et al. on Oct. 9, 1979 discloses a control module for blocking or permitting the passage of light between opposing ends of a pair of optical fiber bundles. The end portions of the optical fiber bundles are held in coaxial alignment by a switch body having a cavity therein which accommodates a generally L-shaped spring formed of a flat strip of resilient material. The end of the long leg of the L is fixed in the body so that in unactuated state the long leg is substantially parallel with the axis of the fiber bundles and the short leg of the L projects toward a gap between the ends of the bundles. An actuator plunger permits the long leg of the L to be deflected so as to bring the short leg of the L into the gap to block the passage of light between the ends of the bundles. The long leg of the L is also formed with a dimple which results in an "oil canning" action of the spring as the plunger is depressed to provide snap action. Because the short leg of the L swings through an arc in a plane containing the axis of the fiber bundles, a relatively wide gap between the ends of the bundles is required to provide clearance for movement of the short leg of the L.

U.S. Pat. No. 4,196,348 issued to N. Iwakiri, et al. on Apr. 1, 1980 discloses a contactless snap action photoelectric switch in which the passage of light between a light emitting diode and a photo electric device is selectively permitted or blocked by a light blocking portion of a shutter, the light blocking portion being carried on the end of an arm extending generally perpendicular to the direction of light transmission. The arm is held in tension by a bowed compression member lying generally in the plane of the arm to provide snap action of the shutter.

U.S. Pat. No. 4,223,217 issued to J.A. Bongard on Sept. 16, 1980 discloses a fiber optic electric switch comprising a fiber optic module which may be inserted in a standard limit switch enclosure, and which is designed so that motion of a conventional snap acting contactor mechanism is transferred to a slidable shutter which, in one position, is located in a gap between opposing ends of a pair of fiber optic cables. Opposite ends of the shutter are held between the ends of a pair of arms in a substantially parallel arm arrangement. One of the arms is L-shaped, with the end of the short leg of the L bearing against the contactor element and being effectively pivoted in the switch housing about a point substantially at the intersection of the long and short legs. The other arm of the parallel arm arrangement is cantilevered from the housing with the free end biasing the shutter toward the L-shaped arm.

British Patent No. 1,527,342 published on Oct. 4, 1978 discloses a plunger actuated snap acting switch which, in one embodiment, is configured to selectively interrupt the passage of light between a light emitting diode and a photo transistor. The snap acting mechanism basically comprises a leaf spring held in compression in the switch housing in a bowed configuration. The spring extends generally parallel with the direction of light transmission. The spring is formed with a folded back L-shaped extension of which the short leg of the L is positioned to be movable into the gap between the light emitting diode and photo transistor so that when the spring is actuated by the plunger to snap into its alternate position, the short leg of the L interrupts the transmission of light.

Of the foregoing prior art designs, only that of U.S. Pat. No. 4,223,217 is configured to simulate a standard electromechanical limit switch in form, fit and mechanical characteristics. However, this design suffers from being mechanically complex. The sliding shutter and parallel arm arrangement are likely to be susceptible to binding which would impair free movement required for precision operation, and are likely to be susptible to mechanical wear and reduced life.

The applicant has provided an optomechanical switch design especially suited for use in a heavy duty limit switch, the movable light blocking shutter mechanism being of exceptionally simple design and arranged to permit a very narrow gap between opposing end faces of a pair of optical fibers so as to maximize light transmission between the end faces when so permitted by the shutter.

SUMMARY OF THE INVENTION

The invention is a snap acting fiber optic switch having a housing adapted to hold the ends of a pair of optical fibers in coaxial alignment perpendicular to and on opposite sides of a plane, and being formed with first and second stop surfaces perpendicular to the plane defining a wedge shaped gap therebetween in which a carrier is partially located. The wedge shaped gap is positioned with its small end further from the fibers than the large end, and a shutter lying and moving in the plane is attached to the end of the carrier proximate the large end of the gap. An over center snap action mechanism including an actuator plunger is operable to bias the carrier toward the first or second stop surfaces, depending on the plunger position, so as to permit or prevent light transmission between the fibers.

DESCRIPTION OF THE PREFERRED EMBODIMENT

Figure 4:
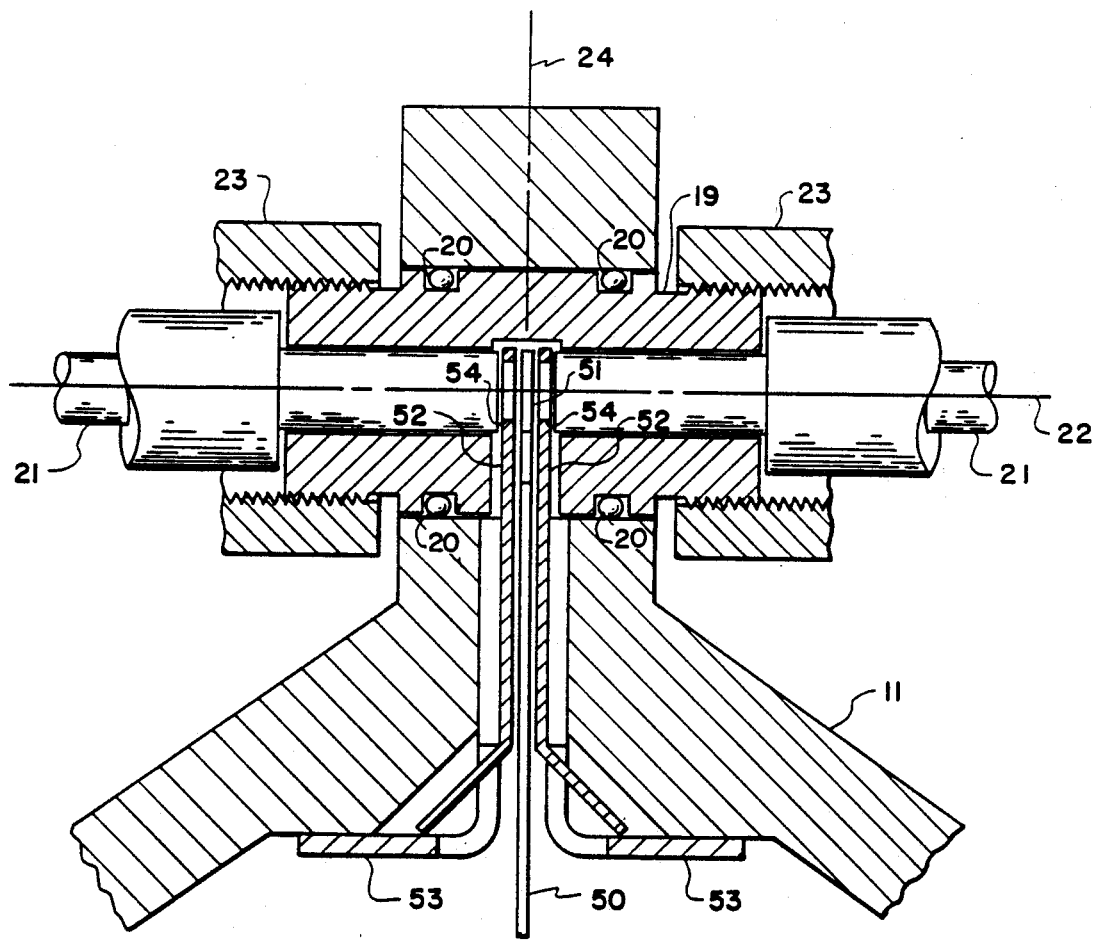
FIG. 4 is an enlarged sectional view of a portion of the switch of FIG. 1 taken along line 4—4.

In the fiber optic limit switch shown in the figures, reference numeral 10 identifies a standard heavy duty limit switch actuator mounted on a fiber optic switch housing 11. Actuator 10 is shown having a rotary shaft 12 on which is clamped an arm 13 having a roller 14 mounted at an end remote from shaft 12. Actuator 10 converts rotary motion of shaft 12 to linear motion of a member which bears on a plunger segment 15 slidably carried in housing 11. Plunger segment 15, in turn, bears on the head of an adjusting screw in a plunger segment 16 in a snap acting mechanism module 17 mounted in housing 11 by means of screws 18. Housing 11 is provided with a fitting 19 having a pair of sealing O-rings 20 thereon for maintaining the end portions of a pair of optical fibers 21 aligned with a common central axis 22. As shown in FIG. 4, the cladding is removed from a short section of the end of each of the fibers and compression nuts 23 are provided for holding the fibers in place. The end faces of the fibers are located on opposite sides of a plane 24 perpendicular to axis 22, the edge of the plane being represented in FIGS. 4, 7 and 8.

Figure 1:
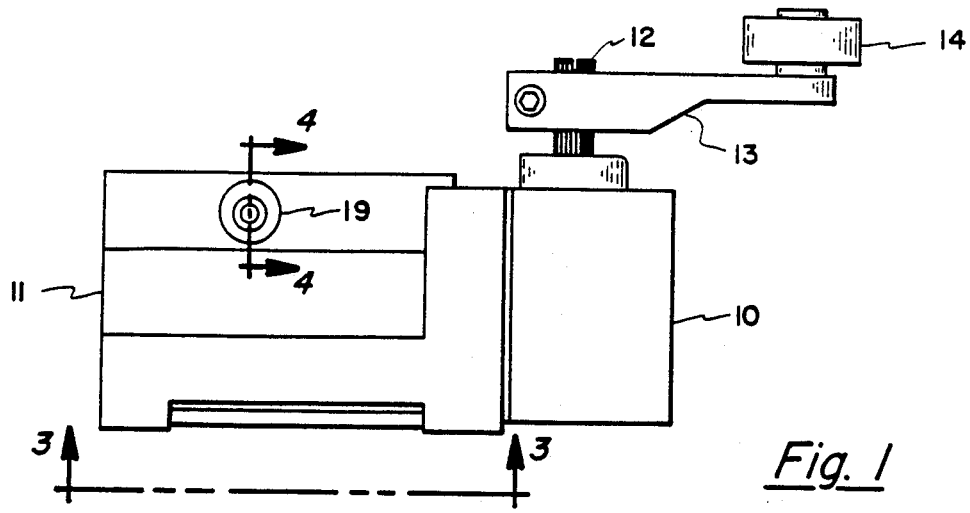
FIG. 1 is an exterior side view of a fiber optic switch in accordance with the applicant's invention configured to provide the form, fit and operating characteristics of a standard heavy duty limit switch.
Figure 2:
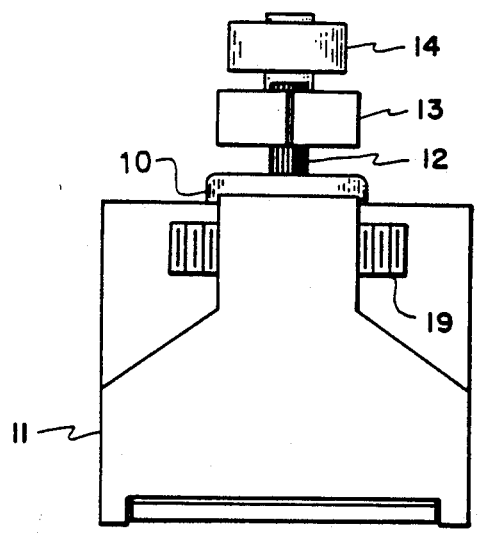
FIG. 2 is an exterior view of the lefthand end of the switch as shown in FIG. 1.
Figure 3:
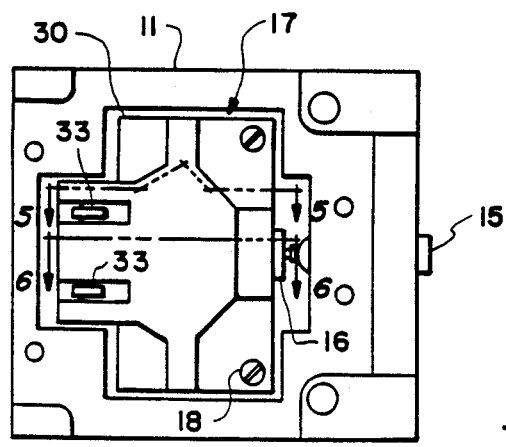
FIG. 3 is a view of a portion of the switch of FIG. 1 with a cover plate removed and taken along line 3—3.

Snap acting mechanism module 17 includes a frame 30 with a removable interlocking retainer 31, opposing portions of which are formed with channels 32 centered on plane 24. As can be seen in FIG. 3, body 30 and retainer 31 interlock in part by means of hook shaped projections 33 on a portion of retainer 31 which hook over a lip on a portion of body 30.

Figure 6:
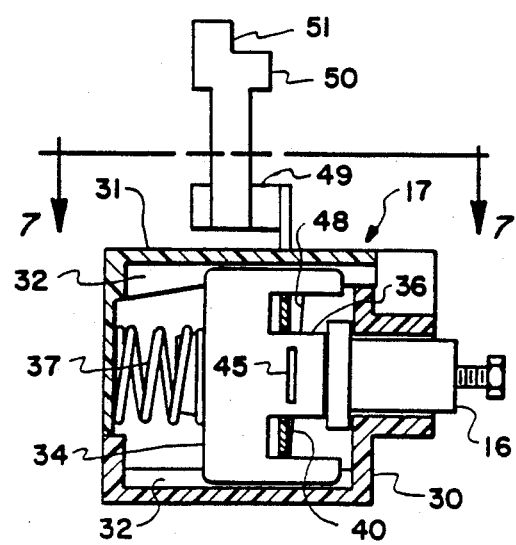
FIG. 6 is an enlarged sectional view of a snap acting mechanism module in the switch taken along line 6—6 in FIG. 3.

Module 17 includes a snap acting mechanism comprising a planar member 34 slidably mounted in channels 32, member 34 being centered on and movable in plane 24. As seen in FIG. 6, member 34 is of a generally E-shaped configuration of which the outer legs slide in channels 32 and a center leg 36 is biased against plunger segment 16 by a coil spring 37 between the back of the E-shaped configuration and a wall of retainer 31.

Figure 8:
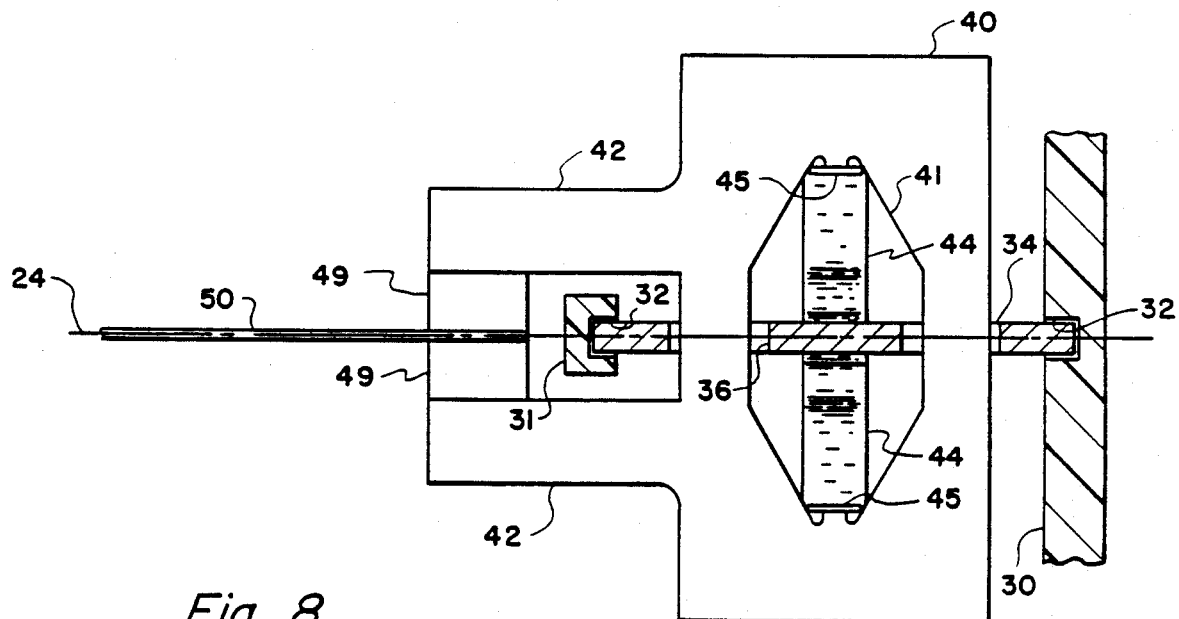
FIG. 8 is a view of the internal mechanism of the module taken along line 8—8 in FIG. 7.

As best illustrated in FIG. 8, the snap acting mechanism also includes a carrier 40 having an aperture 41 therein and a pair of projecting portions 42 extending from one side thereof. Carrier 40 is positioned so that leg 36 of E-shaped member 34 projects through aperture 41 and one of the outer legs of the E-shaped member extends between projecting portions 42 of the carrier. Carrier 40 is of planar configuration lying in a plane perpendicular to plane 24.

As shown in FIG. 8, aperture 41 is formed with tapered opposing ends, each having a small inward projection. A pair of C-shaped leaf springs 44 are fitted in compression between center leg 36 of E-shaped member 34 and the ends of aperture 41. The inner ends of springs 44 are held in place by grooves 45 (see FIG. 6) in the faces of leg 36. The outer ends of springs 44 are held in place by configuring them with narrow extensions 45 thereon which project through aperture 41 and bear on the projections at the ends thereof.

Figure 7:
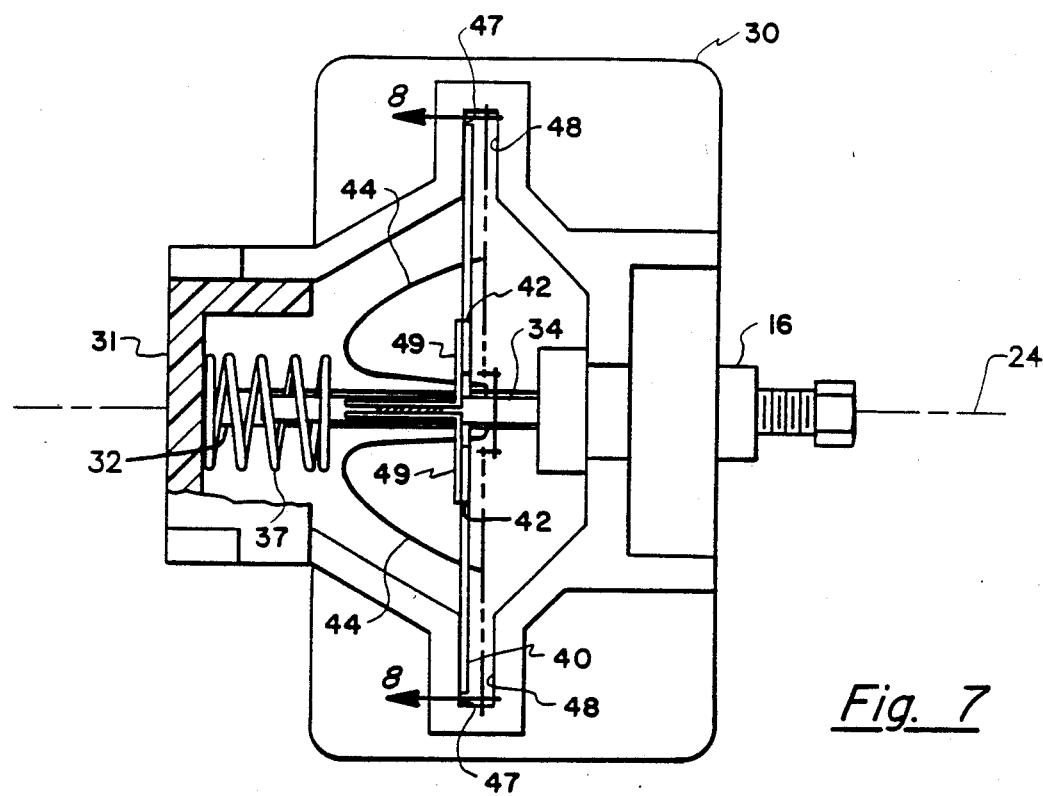
FIG. 7 is a further enlarged view of the module taken along line 7—7 in FIG. 6 and with a retainer member removed to show internal features.

As can be seen in FIG. 7, the geometry of member 34, carrier 40 and C-shaped springs 44 is such as to create an over center snap acting mechanism. With plunger segment 16 and member 34 at their rest positions biased to the right as seen in FIGS. 6 and 7, springs 44 cause carrier 40 to be biased to the left. As plunger segment 16 and member 40 are depressed against spring 37, the inner ends of springs 44 move to the left of the plane of carrier 40, which springs 44 then bias to the right.

Figure 5:
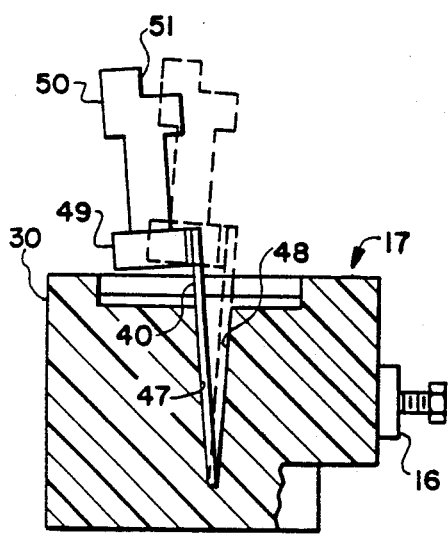
FIG. 5 is an enlarged sectional view of a portion of the switch taken along line 5—5 in FIG. 3, and shown with an exaggerated wedge shaped gap to more clearly illustrate the motion of a carrier and shutter in the switch.

The limiting and only stable positions of carrier 40 are determined by stop surfaces 47 and 48 in frame 30. Stop surfaces 47 and 48 lie in nonparallel planes perpendicular to plane 24. As illustrated in exaggerated form in FIG. 5, stop surfaces 47 and 48 have a wedge shaped gap therebetween. From FIG. 5 in conjunction with FIG. 4, it can be seen that the planes of stop surfaces 47 and 48 converge with increasing distance from axis 22 of optical fibers 21 so that the edges of the stop surfaces closest to the axis of the fibers are further apart than the edges of the surfaces furthest from the axis of the fibers.

A pair of angle brackets 49 are spot welded or otherwise suitably attached to the ends of projections 42 on member 40 so that legs of the brackets extend parallel with the plane 24 with a narrow gap therebetween. One end of a thin shutter 50 is attached between these legs of brackets 49 by spot welding or other suitable means of attachment. Shutter 50 lies in and is movable in plane 24, and includes a light blocking portion 51 positioned between a pair of shield members 52 (see FIG. 4) in a gap between the end faces of optical fibers 21. Shield members 52 are supported by brackets 53 mounted in housing 11, and have apertures 54 therethrough aligned with optical fibers 21.

Apertures 54 are slightly smaller than the cross sections of optical fibers 21 to prevent the ends of the fibers from being positioned sufficiently close to a light blocking portion 51 of shutter 50 to interfere with its operation. However, both shutter 50 and shield members 52 are very thin and the clearances therebetween are very small so that the gap between the end faces of optical fibers 21 is in the order of a few thousandths of an inch to maximize the transmission of light between the fibers. The gap can be minimized because the shutter lies and moves in plane 24 which is perpendicular to axis 22. Precise operation is provided in part because the displacement of carrier 40 between its alternate positions can be made very small. By arranging the stop surfaces which determine the limiting positions of carrier 40 in nonparallel planes with a wedge shape gap therebetween, the small motion of carrier 40 as transmitted to shutter 50, can be amplified sufficiently to effectively completely block or unblock the passage of light between the ends of fibers 21. Finally, these operational features are accomplished with very simple modifications to the mechanism of a standard well proven snap acting switch.

Although a particular embodiment of the applicant's unique snap acting fiber optic switch has been shown in detail for illustrative purposes, various modifications which do not depart from the applicant's teachings will be apparent to those of ordinary skill in the relevant arts. It is not intended that coverage be limited to the embodiment shown, but only by the terms of the following claims.

The embodiments of the invention in which an exclusive property or right is claimed are defined as follows.

I claim:

1. A fiber optic snap switch comprising:

a housing adapted to hold the ends of a pair of optical fibers in substantial alignment with an axis and with opposing end faces of the fiber on opposite sides of and parallel with a plane transverse to the axis, the end faces being separated by a gap, said housing being formed so as to define first and second nonparallel stop surfaces, each stop surface extending between first and second edges, the second edge being located further from the axis than the first edge, the first edges of the first and second stop surfaces being spaced further apart than the second edges thereof;

a carrier having a first portion located between the first and second stop surfaces and being movable in said plane between first and second positions in which the first portion thereof contacts the first and second stop surfaces respectively;

a shutter fixed to said carrier and having a light blocking portion in said plane positioned for movement into and out of the gap between opposing end faces of the optical fibers as said carrier is moved to its first and second positions respectively; and an over center snap acting mechanism including an actuator plunger operable to bias said carrier toward the first or second stop surfaces, depending on the plunger position.

2. A snap acting fiber optic switch comprising:

a housing adapted to hold the ends of a pair of optical fibers in coaxial alignment perpendicular to and on opposite sides of a plane so as to provide a gap between opposing end faces of the fibers, said housing being formed with first and second stop surfaces substantially perpendicular to the plane defining a wedge shaped gap therebetween separated from the optical fibers, the small end of the wedge shaped gap being located further from the fibers than the large end of the wedge shaped gap;

a carrier partially located in the wedge shaped gap and movable between first and second positions in which said carrier contacts the first and second stop surfaces respectively;

a shutter mounted on said carrier and having a light blocking portion positioned for movement into and out of the gap between opposing end faces of the optical fibers as said carrier is moved to its first and second positions respectively; and an over center snap acting mechanism including an actuator plunger operable to bias said carrier toward the first or second stop surfaces, depending on the plunger position.

3. In a fiber optic snap acting switch having a housing adapted to hold the end portions of a pair of optical fibers in substantially coaxial alignment and with a gap between the end faces of the fibers, a shutter assembly having spaced apart carrier and light blocking portions, the shutter assembly being movably mounted in said housing with the light blocking portion positioned for movement into and out of the gap and a plunger actuated over center snap acting mechanism for causing the shutter assembly to move to first or second positions in which the transmission of light between the end faces of the fibers is permitted or blocked respectively, the improvement which comprises:

first and second stop surfaces in said housing having a wedge shaped gap therebetween in which is located the carrier portion of the shutter assembly, the end of the shutter assembly most remote from the light blocking portion being located at the narrow end of the wedge shaped gap; and the shutter assembly and snap acting mechanism configured and adapted to cooperate so that the light blocking portion of the shutter assembly lies and moves in a first plane and the first and second positions of said assembly are determined by the carrier portion thereof coming to rest against the first and second stop surfaces respectively.

4. The fiber optic switch of claim 3 wherein:

the end portions of the pair of optical fibers are aligned with a central axis;

the first plane is perpendicular to the axis and substantially centered in the gap between the end faces of the fibers; and the carrier portion of the shutter assembly comprises a planer portion lying in a second plane substantially perpendicular of the first plane, the second plane moving to the first and second stop surfaces as the shutter assembly is moved to its first and second positions respectively.

5. The fiber optic switch of claim 4 including a pair of shields mounted in the housing substantially parallel with the first plane so as to be positioned in the gap between the end faces of the pair of optical fibers, each of said shields having an aperture therethrough aligned with the end portions of the fibers and being slightly smaller than the cross section of the fibers, said shields being spaced apart to provide a gap therebetween slightly wider than the thickness of the light blocking portion of the shutter assembly to permit unimpeded movement thereof.

* * * * *